(12) United States Patent
Nishiyama et al.

(10) Patent No.: US 8,574,787 B2
(45) Date of Patent: Nov. 5, 2013

(54) FUEL CELL STACK

(75) Inventors: Tadashi Nishiyama, Sakura (JP); Go Morimoto, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 379 days.

(21) Appl. No.: 12/759,161

(22) Filed: Apr. 13, 2010

(65) Prior Publication Data

US 2010/0261088 A1  Oct. 14, 2010

(30) Foreign Application Priority Data

Apr. 14, 2009 (JP) ................................. 2009-098287

(51) Int. Cl.
*H01M 2/08* (2006.01)

(52) U.S. Cl.
USPC ............ 429/511; 429/452; 429/507; 429/508

(58) Field of Classification Search
USPC .................. 429/452, 507, 508, 511
See application file for complete search history.

(56) References Cited

U.S. PATENT DOCUMENTS

2005/0170235 A1* 8/2005 Hu et al. .......................... 429/38
2009/0214928 A1* 8/2009 Kim et al. ....................... 429/34

FOREIGN PATENT DOCUMENTS

| JP | 2000-48850 | 2/2000 |
|---|---|---|
| JP | 2004-185845 | 7/2004 |
| JP | 2006-100021 | 4/2006 |
| JP | 2007-173166 | 7/2007 |
| JP | 2008-78071 | 4/2008 |

OTHER PUBLICATIONS

Japanese Office Action for Application No. 2009-098287, dated Aug. 30, 2011.
Chinese Office Action for Application No. 201010161471.2, 7 pages, dated Apr. 6, 2012.

* cited by examiner

*Primary Examiner* — Patrick Ryan
*Assistant Examiner* — Ben Lewis
(74) *Attorney, Agent, or Firm* — Nelson Mullins Riley & Scarbourgh LLP; Anthony A. Laurentano; Neslihan I. Doran (57) ABSTRACT

A fuel cell stack includes a plurality of fuel cells stacked together, and a pair of end plates provided at opposite ends the fuel cells in the stacking direction. Further, the fuel cell stack includes coupling members bridging between the end plates, holding mechanisms provided in side surfaces of the end plates and the coupling members for applying tension in a tightening direction, and fixing mechanisms for fixing the side surfaces of the end plates and the coupling members together. The holding mechanism has a pin member inserted into the side surface of the end plate and the coupling member. Further, the fixing mechanism has a screw for fixing the coupling member to the side surface of the end plate.

7 Claims, 7 Drawing Sheets

PRIOR ART

FIG. 7

FUEL CELL STACK

CROSS-REFERENCE TO RELATED APPLICATION

This application is based upon and claims the benefit of priority from Japanese Patent Application No. 2009-098287 filed on Apr. 14, 2009, of which the contents are incorporated herein by reference.

BACKGROUND OF THE INVENTION

1. Field of the Invention

The present invention relates to a fuel cell stack including a plurality of fuel cells stacked together and end plates provided at opposite ends of the fuel cells in the stacking direction. Each of the fuel cells includes a membrane electrode assembly and a separator stacked together. The membrane electrode assembly includes a pair of electrodes and an electrolyte membrane interposed between the electrodes.

2. Description of the Related Art

For example, a solid polymer electrolyte fuel cell employs an electrolyte membrane (electrolyte) comprising a polymer ion exchange membrane. The electrolyte membrane is interposed between an anode and a cathode to form a membrane electrode assembly (MEA). The membrane electrode assembly is sandwiched between separators to form a unit of power generation cell (unit cell) for generating electricity. In use, generally, a predetermined number of such unit cells are stacked together to form a fuel cell stack.

In order to obtain the desired power generation performance and achieve the sealing function, a suitable tightening load needs to be applied to the fuel cell stack in the stacking direction.

Figure 7:
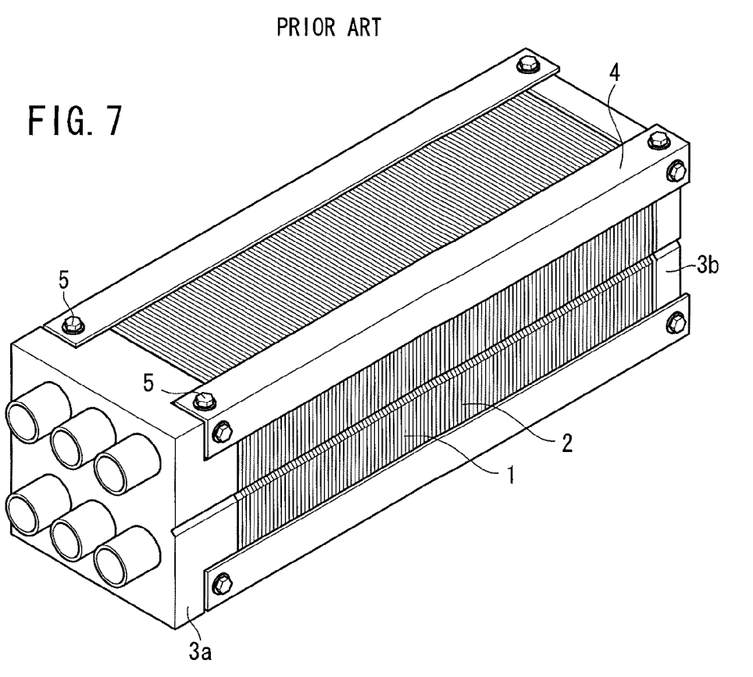
FIG. 7 is a perspective view showing a fuel cell disclosed in Japanese Laid-Open Patent Publication No. 2000-048850.

In this regard, for example, in a fuel cell disclosed in Japanese Laid-Open Patent Publication No. 2000-048850, as shown in FIG. 7, predetermined numbers of separators 1 and electrode units 2 are stacked together to form a stack body, and pressure plates 3a, 3b are provided at opposite ends of the stack body. Holding members 4 each having an L-shape in cross section are provided at respective corners of the pressure plates 3a, 3b. The holding members 4 are tightened to the pressure plates 3a, 3b using screws 5.

That is, a tightening load in the stacking direction is applied to the separators 1 and the electrode units 2 between the pressure plates 3a, 3b through the four holding members 4.

However, in Japanese Laid-Open Patent Publication No. 2000-048850, the holding members 4 and the pressure plates 3a, 3b are tightened together simply by the screws 5 inserted through the holding members 4 and screwed into screw holes formed on sides of the pressure plates 3a, 3b.

In the structure, when a load is applied to the fuel cell from the outside, the outer shape of the stack body is deformed easily, and the desired tightening load in the stacking direction cannot be maintained. As a consequence, the tightening load applied to the stack body may become insufficient. Further, due to deformation in the outer shape of the stack body, the separators 1 and the electrode units 2 may move undesirably.

SUMMARY OF THE INVENTION

The present invention has been made to solve the problems of this type, and an object of the present invention is to provide a fuel cell stack having a simple structure in which, for example, external loads or the like can be received reliably, deformation of the fuel cell stack is suppressed suitably, and the tightening load applied to the fuel cell stack does not become insufficient.

The present invention relates to a fuel cell stack including a plurality of fuel cells stacked together and a pair of end plates provided at opposite ends of the fuel cells in a stacking direction. Each of the fuel cells includes a membrane electrode assembly and a separator stacked together, the membrane electrode assembly including a pair of electrodes and an electrolyte membrane interposed between the electrodes.

The fuel cell stack further includes a coupling member bridging between the end plates, a holding mechanism provided in a side surface of the end plate and the coupling member, for applying tension in a tightening direction, and a fixing mechanism for fixing the side surface of the end plate and the coupling member together.

According to the present invention, tension is applied to the coupling member and the end plate together in the tightening direction through the holding mechanism. The tightening force applied to the coupling member and the end plate is maintained through the fixing mechanism. Therefore, with the simple structure, the desired tightening force is applied to the fuel cell stack reliably.

Further, when a load is applied to the fuel cell stack from the outside, by the fixing mechanism, peeling of the coupling member is prevented. Further, the coupling member receives impact from the outside to protect the fuel cells. Thus, it becomes possible to prevent deformation (distortion) of the fuel cells.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
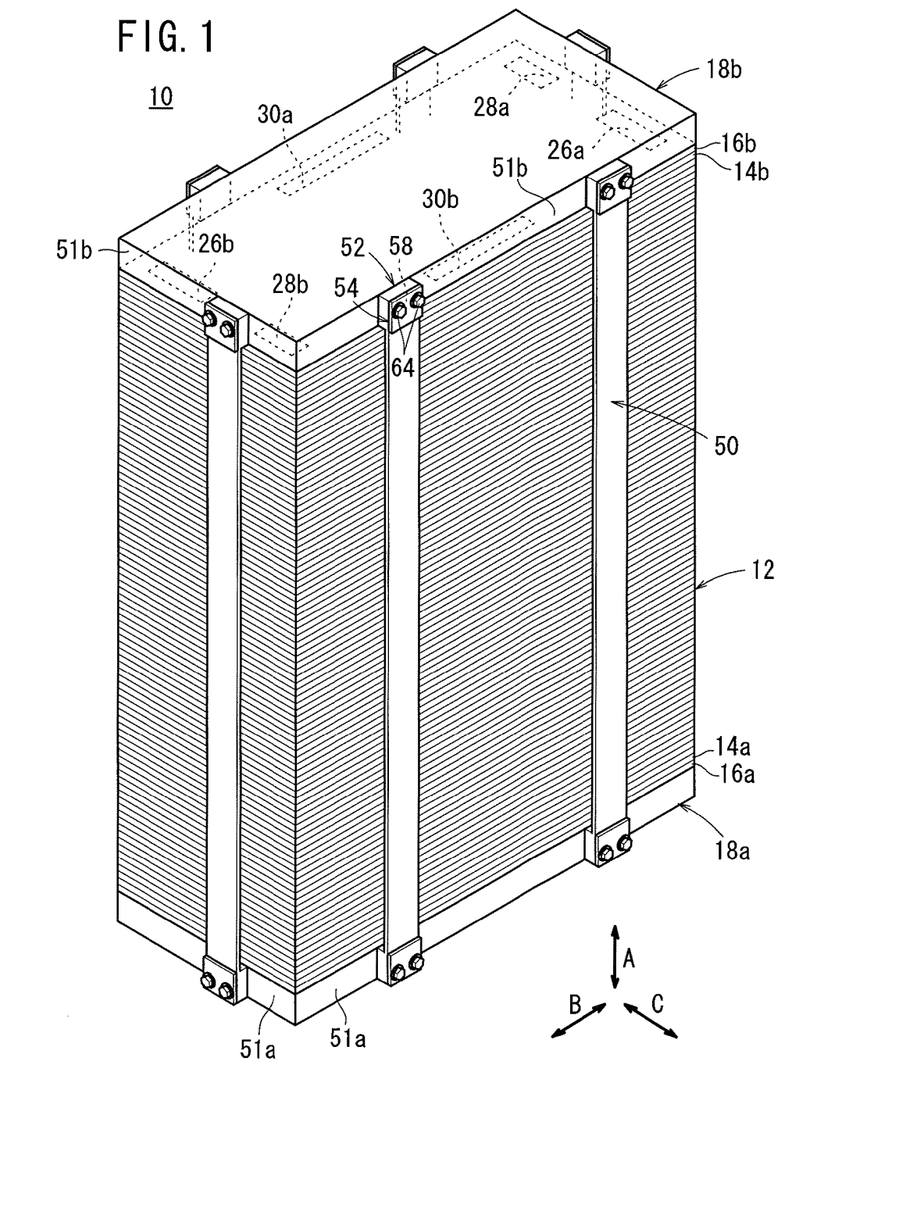
FIG. 1 is a perspective view schematically showing a fuel cell stack according to a first embodiment of the present invention.

As shown in FIG. 1, a fuel cell stack 10 according to a first embodiment of the present invention is formed by stacking a plurality of fuel cells 12 in a vertical direction indicated by an arrow A. At opposite ends of the fuel cells 12 in the stacking direction, terminal plates 14a, 14b are provided. Insulating plates 16a, 16b are provided outside the terminal plates 14a, 14b. Further, end plates 18a, 18b are provided outside the insulating plates 16a, 16b.

Figure 2:
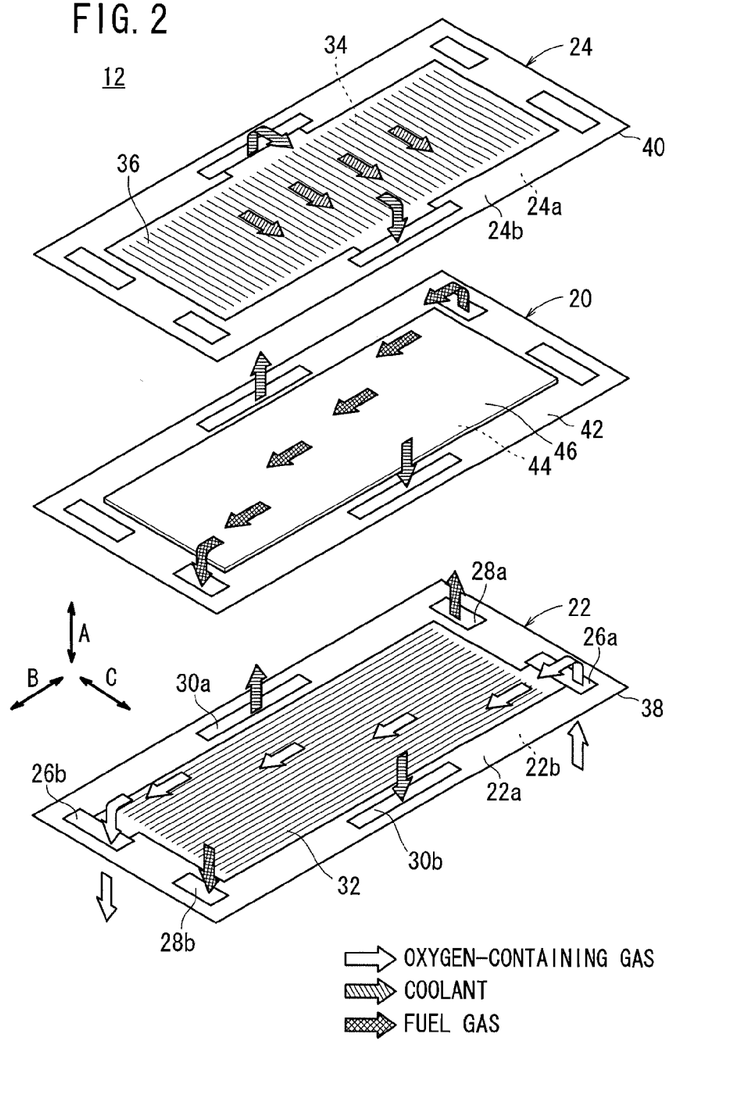
FIG. 2 is an exploded perspective view showing main components of a fuel cell of the fuel cell stack.

As shown in FIG. 2, each of the fuel cells 12 includes a membrane electrode assembly 20, and first and second separators 22, 24 sandwiching the membrane electrode assembly 20. For example, the first separator 22 and the second separator 24 are metal separators of steel plates, stainless steel plates, aluminum plates, or plated steel sheets. Alternatively, carbon separators may be used as the first and second separators 22, 24.

At one end of the fuel cell 12 in a horizontal direction indicated by an arrow B in FIG. 2, an oxygen-containing gas supply passage 26a for supplying an oxygen-containing gas and a fuel gas supply passage 28a for supplying a fuel gas such as a hydrogen-containing gas are arranged in a horizontal direction indicated by an arrow C. The oxygen-containing gas supply passage 26a and the fuel gas supply passage 28a extend through the fuel cell 12 in the direction indicated by the arrow A.

At the other end of the fuel cell 12 in the direction indicated by the arrow B, a fuel gas discharge passage 28b for discharging the fuel gas and an oxygen-containing gas discharge passage 26b for discharging the oxygen-containing gas are arranged in the horizontal direction indicated by the arrow C. The fuel gas discharge passage 28b and the oxygen-containing gas discharge passage 26b extend through the fuel cell 12 in the direction indicated by the arrow A.

At opposite ends of the fuel cell 12 in the direction indicated by the arrow C, a coolant supply passage 30a for supplying a coolant, and a coolant discharge passage 30b for discharging the coolant are provided.

The first separator (cathode side separator) 22 has an oxygen-containing gas flow field 32 on its surface 22a facing the membrane electrode assembly 20. The oxygen-containing gas flow field 32 is connected to the oxygen-containing gas supply passage 26a and the oxygen-containing gas discharge passage 26b.

The second separator (anode side separator) 24 has a fuel gas flow field 34 on its surface 24a facing the membrane electrode assembly 20. The fuel gas flow field 34 is connected to the fuel gas supply passage 28a and the fuel gas discharge passage 28b.

A coolant flow field 36 is provided between a surface 22b of the first separator 22 of one of the adjacent fuel cells 12 and a surface 24b of the second separator 24 of the other of the adjacent fuel cells 12. The coolant flow field 36 is connected to the coolant supply passage 30a and the coolant discharge passage 30b.

A first seal member 38 is formed integrally on the surfaces 22a, 22b of the first separator 22. Alternatively, a separate seal member as the first seal member 38 may be provided on the surfaces 22a, 22b of the first separator 22. A second seal member 40 is formed integrally on the surfaces 24a, 24b of the second separator 24. Alternatively, a separate seal member as the second seal member 40 may be provided on the surfaces 24a, 24b of the second separator 24.

For example, the first and second seal members 38, 40 are made of seal material, cushion material or packing material such as EPDM (Ethylene Propylene Diene Monomer), NBR (Nitrile Butadiene Rubber), fluoro rubber, silicone rubber, fluoro silicone rubber, butyl rubber, natural rubber, styrene rubber, chloroprene rubber, or acrylic rubber.

The membrane electrode assembly 20 includes a cathode 44, an anode 46, and a solid polymer electrolyte membrane 42 interposed between the cathode 44 and the anode 46. The solid polymer electrolyte membrane 42 is formed by impregnating a thin membrane of perfluorosulfonic acid with water, for example.

Each of the cathode 44 and the anode 46 has a gas diffusion layer (not shown) such as a carbon paper, and an electrode catalyst layer (not shown) of platinum alloy supported on porous carbon particles. The carbon particles are deposited uniformly on the surface of the gas diffusion layer. The electrode catalyst layer of the cathode 44 and the electrode catalyst layer of the anode 46 are formed on both surfaces of the solid polymer electrolyte membrane 42, respectively.

As shown in FIG. 1, a plurality of coupling members 50 bridge between the end plates 18a, 18b made of aluminum. For example, the coupling members 50 are elongated plates of aluminum. Two coupling members 50 are provided on each of long sides of the fuel cell stack 10, and one coupling member 50 is provided on each of short sides of the fuel cell stack 10.

The coupling members 50 on the long sides are provided at positions spaced (offset) from the coolant supply passage 30a and the coolant discharge passage 30b. The coupling members 50 on the short sides are provided between the oxygen-containing gas supply passage 26a and the fuel gas supply passage 28a, and between the oxygen-containing gas discharge passage 26b and the fuel gas discharge passage 28b.

The fuel cell stack 10 includes holding mechanisms 52 provided in the side surfaces 51a, 51b of the end plates 18a, 18b and the coupling members 50, for applying tension in the tightening direction indicated by the arrow A, and fixing mechanisms 54 for fixing the side surfaces 51a, 51b of the end plates 18a, 18b and the coupling members 50 together. The holding mechanisms 52 and the fixing mechanisms 54 with respect to the end plate 18a and the holding mechanism 52 and the fixing mechanisms 54 with respect to the end plate 18b have the same structure.

Figure 3:
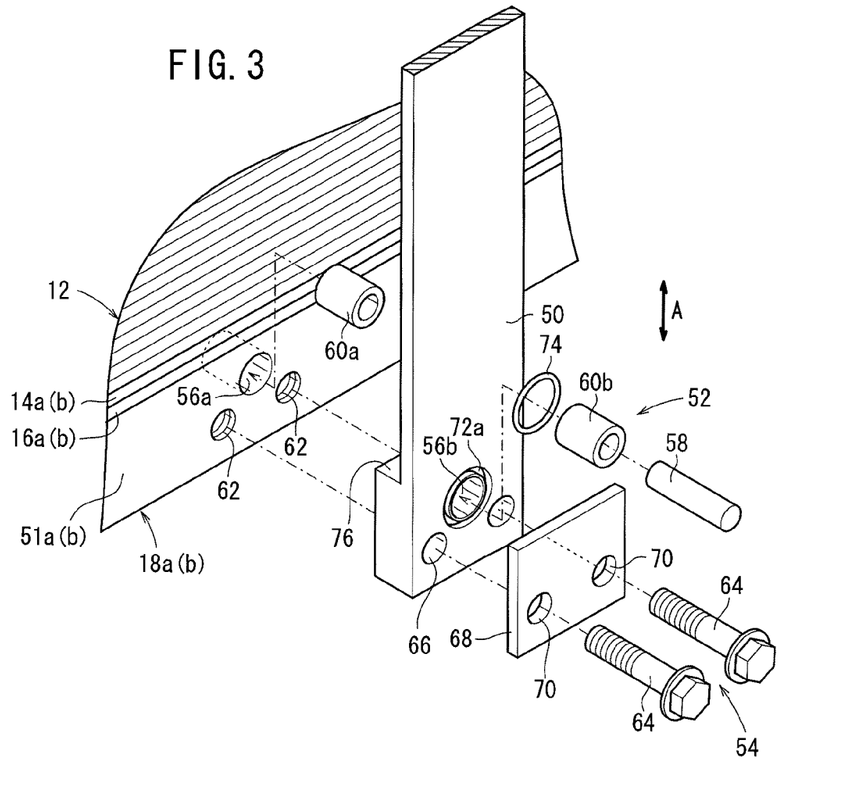
FIG. 3 is an exploded perspective view showing a holding mechanism and a fixing mechanism on one side, of the fuel cell stack.
Figure 4:
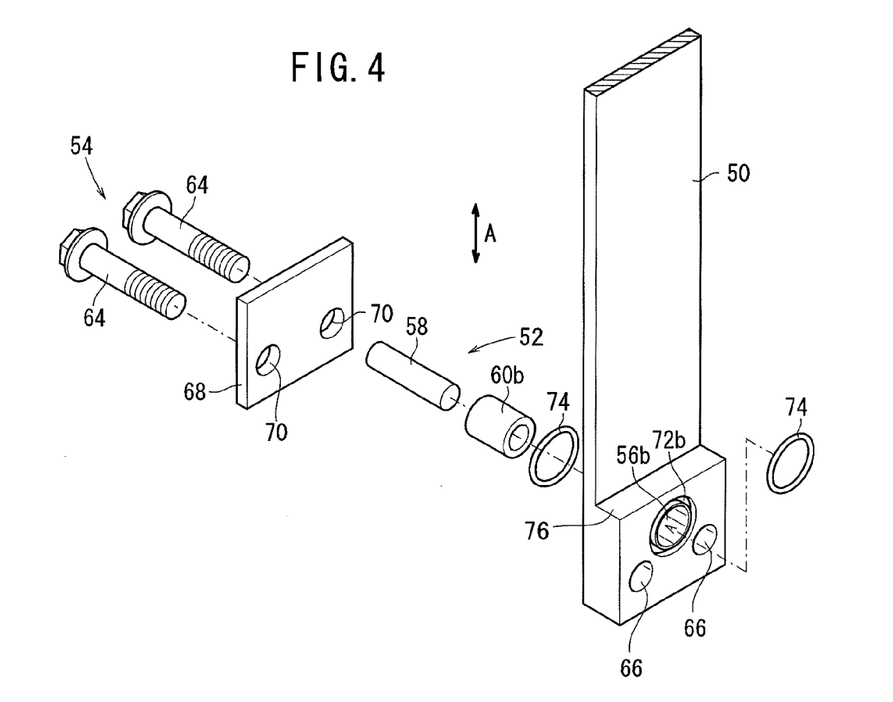
FIG. 4 is an exploded perspective view showing the holding mechanism and the fixing mechanism on the other side.

As shown in FIGS. 3 and 4, each of the holding mechanisms 52 has a first hole 56a formed in one of the side surfaces 51a, 51b of the end plates 18a, 18b, a second hole 56b formed in one of upper and lower ends of the coupling member 50, and a pin member 58 inserted into the first and second holes 56a, 56b. For example, the pin member 58 is made of iron based material.

Reinforcement rings 60a, 60b, e.g., made of iron based material, are press-fitted into the first and second holes 56a, 56b, respectively. The pin member 58 is inserted into the reinforcement rings 60a, 60b.

Each of the fixing mechanisms 54 has screw holes 62 formed on both sides of the first hole 56a and screws 64 fitted into the screw holes 62, on one of the side surfaces 51a, 51b of the end plates 18a, 18b.

The coupling member 50 has a pair of holes 66 corresponding to the screw holes 62. A pin cover 68 is provided on the front side of the coupling member 50. The pin cover 68 has a pair of holes 70 for inserting screws 64 therethrough. The screws 64 pass through the holes 66, and are tightened in the screw holes 62.

Seal grooves 72a, 72b are formed along the openings at both ends of the second hole 56b of the coupling member 50. O-rings 74 are fitted into the seal grooves 72a, 72b. A thick portion 76 is formed on the back side of the coupling member 50, i.e., on the side facing the side surface 51a of the end plate 18a or the side surface 51b of the end plate 18b. The thick portion 76 abuts against the side surface 51a of the end plate 18a or the side surface 51b of the end plate 18b. The thick portion 76 is formed by reducing the thickness of part of the coupling member 50 that faces the fuel cells 12. The thick portion 76 is provided for preventing interference with the fuel cells 12, and for achieving weight reduction of the coupling member 50.

The end plate 18a shown in FIG. 1 has manifolds (not shown) connected to the oxygen-containing gas supply passage 26a, the fuel gas supply passage 28a, the coolant supply passage 30a, the oxygen-containing gas discharge passage 26b, the fuel gas discharge passage 28b, and the coolant discharge passage 30b, and extending to the outside. The end plate 18b has a flat plate shape as a cover for closing the fuel cell stack 10.

Operation of the fuel cell stack 10 will be described below.

Firstly, as shown in FIG. 2, an oxygen-containing gas is supplied to the oxygen-containing gas supply passage 26a, and a fuel gas such as a hydrogen-containing gas is supplied to the fuel gas supply passage 28a. Further, a coolant such as pure water, ethylene glycol, or oil is supplied to the coolant supply passage 30a.

Thus, the oxygen-containing gas flows from the oxygen-containing gas supply passage 26a to the oxygen-containing gas flow field 32 of the first separator 22. The oxygen-containing gas flows in the direction indicated by the arrow B, and the oxygen-containing gas is supplied to the cathode 44 of the membrane electrode assembly 20 for inducing an electrochemical reaction at the cathode 44.

The fuel gas flows from the fuel gas supply passage 28a to the fuel gas flow field 34 of the second separator 24. The fuel gas flows in the direction indicated by the arrow B, and the fuel gas is supplied to the anode 46 of the membrane electrode assembly 20 for inducing an electrochemical reaction at the anode 46.

Thus, in the membrane electrode assembly 20, the oxygen-containing gas supplied to the cathode 44 and the fuel gas supplied to the anode 46 are consumed in the electrochemical reactions at catalyst layers of the cathode 44 and the anode 46 for generating electricity.

The oxygen-containing gas consumed at the cathode 44 is discharged along the oxygen-containing gas discharge passage 26b in the direction indicated by the arrow A. The fuel gas consumed at the anode 46 is discharged along the fuel gas discharge passage 28b in the direction indicated by the arrow A.

Further, the coolant supplied to the coolant supply passage 30a flows into the coolant flow field 36 between the first and second separators 22, 24. Then, the coolant flows in the direction indicated by the arrow C. After the coolant cools the membrane electrode assembly 20, the coolant is discharged from the coolant discharge passage 30b.

In the first embodiment, the fuel cell stack 10 includes the coupling members 50 bridging between the pair of end plates 18a, 18b, the holding mechanisms 52 provided in the side surfaces 51a, 51b of the end plates 18a, 18b and both ends of the coupling members 50 for applying tension in the tightening direction, and the fixing mechanisms 54 for fixing the side surfaces 51a, 51b of the end plates 18a, 18b and both ends of the coupling members 50 together.

In the structure, the tension in the tightening direction is applied to the coupling members 50 and the end plates 18a, 18b together through the holding mechanisms 52. Further, the tightening force for tightening the coupling members 50 and the end plates 18a, 18b is maintained by the fixing mechanism 54. With the simple structure, it becomes possible to reliably apply the desired tightening force to the components of the fuel cell stack 10, and the distance between the end plates 18a, 18b can be kept constant by the coupling members 50 and the holding mechanisms 52.

Further, when a load is applied to the fuel cell stack 10 from the outside, by the function of the fixing mechanisms 54, peeling of the coupling members 50 can be prevented advantageously.

Further, the coupling members 50 receive impact from the outside to protect the fuel cells 12. Thus, it becomes possible to prevent deformation (distortion) of the fuel cells 12.

Further, the holding mechanism 52 has the first hole 56a formed on the side surface 51a of the end plate 18a or the side surface 51b of the end plate 18b, the second hole 56b formed in each of both ends of the coupling member 50, and the pin member 58 inserted into the first and second holes 56a, 56b. Thus, the structure of the holding mechanism 52 is simplified economically.

Further, the reinforcement rings 60a, 60b made of iron based material are press-fitted into the first and second holes 56a, 56b, respectively. In the structure, though the pin member 58 is inserted into the first and second holes 56a, 56b to hold the tightening load, deformation of the first and second holes 56a, 56b due to the tightening load is prevented effectively.

Further, the O-rings 74 are fitted in the seal grooves 72a, 72b provided at both ends of the coupling member 50, and serve as a sealing member for sealing the pin member 58. Therefore, though the pin member 58 is made of, in particular, iron based material in consideration of the mechanical strength, the pin member 58 is isolated from the water environment. Therefore, occurrence of electrochemical corrosion in the pin member 58 is prevented advantageously.

Figure 5:
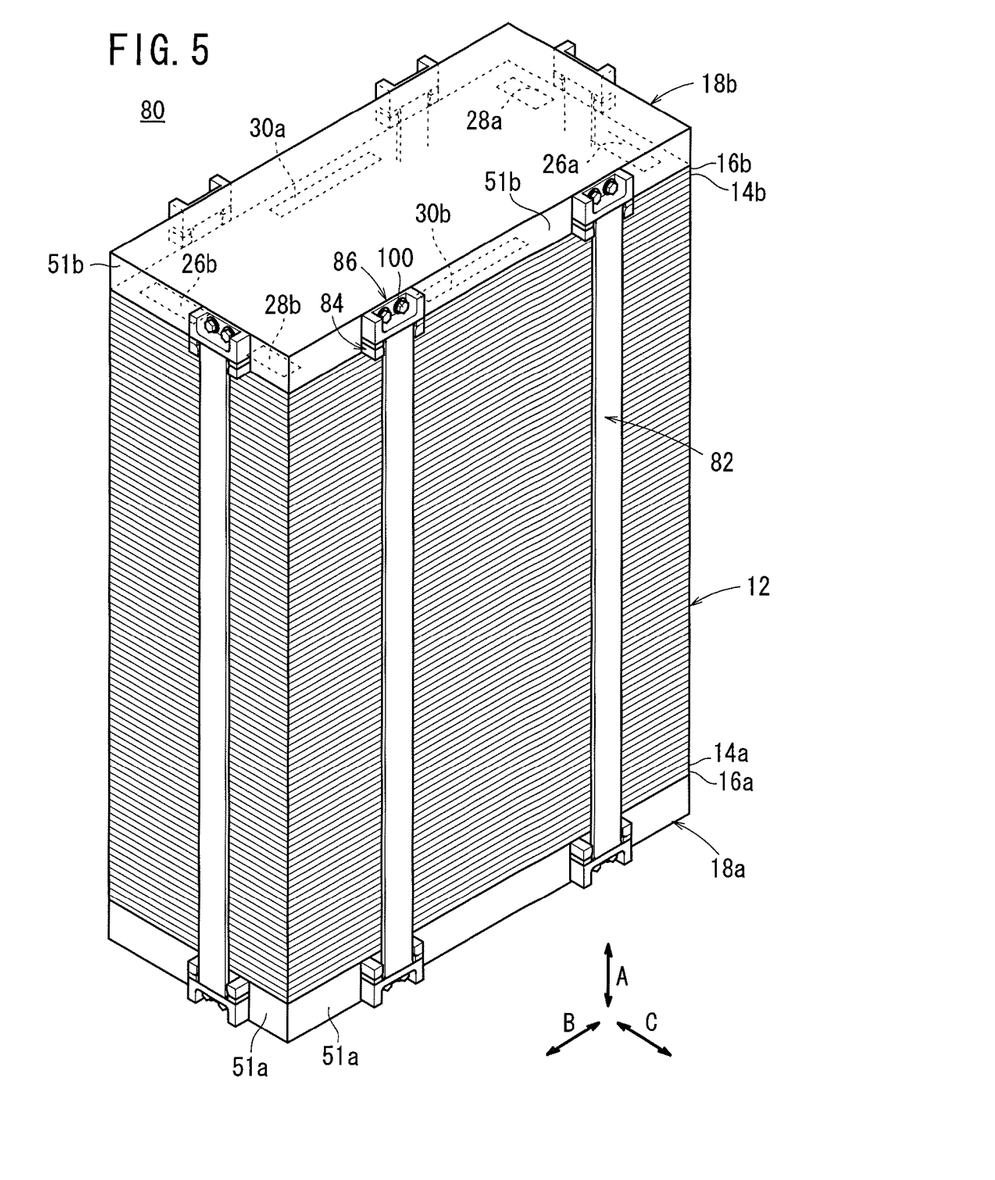
FIG. 5 is a perspective view showing a fuel cell stack according to a second embodiment of the present invention.

FIG. 5 is a perspective view showing a fuel cell stack 80 according to a second embodiment of the present invention. The constituent elements that are identical to those of the fuel cell stack 10 according to the first embodiment are labeled with the same reference numerals, and descriptions thereof will be omitted.

The fuel cell stack 80 includes coupling members 82 bridging between a pair of the end plates 18a, 18b, holding mechanisms 84 provided in the side surfaces 51a, 51b of the end plates 18a, 18b and the coupling members 82 for applying tension to the end plates 18a, 18b and the coupling members 82 together in the tightening direction, and fixing mechanisms 86 for fixing the side surfaces 51a, 51b of the end plates 18a, 18b and the coupling members 82 together.

As in the case of the coupling members 50 of the first embodiment, two coupling members 82 are provided on each of long sides of the fuel cell stack 10, and one coupling member 50 is provided on each of short sides of the fuel cell stack 10. The coupling members 82 are provided at positions offset from the oxygen-containing gas supply passage 26a, the fuel gas supply passage 28a, the coolant supply passage 30a, the oxygen-containing gas discharge passage 26b, the fuel gas discharge passage 28b, and the coolant discharge passage 30b.

Figure 6:
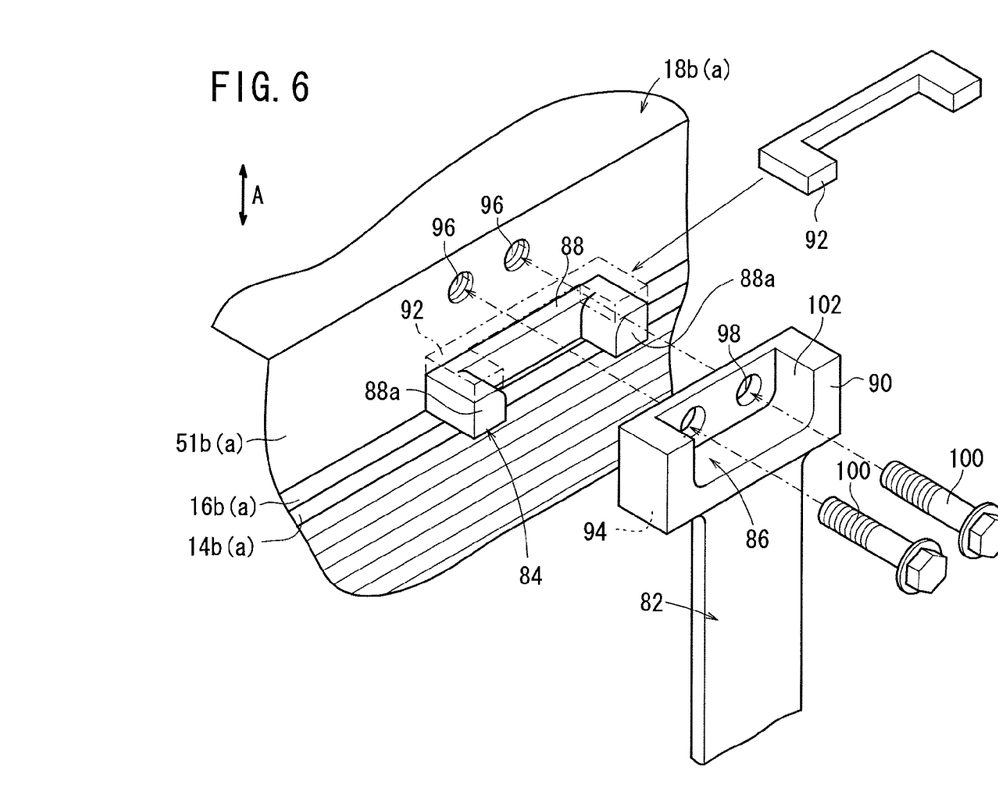
FIG. 6 is an exploded perspective view showing a holding mechanism and a fixing mechanism of the fuel cell stack.

As shown in FIG. 6, the holding mechanism 84 includes a projection 88 provided on the side surface 51a of the end plate 18a or the side surface 51b of the end plate 18b, and an extension 90 provided at both ends of the coupling members 82 and extending laterally outwardly from the coupling member 82 to engage the projection 88.

The projection 88 extends, by a predetermined length, outwardly from the side surface 51a of the end plate 18a or the side surface 51b of the end plate 18b, and includes engagement sections 88a projecting from both ends thereof. The extension 90 is provided outwardly in the stacking direction across the projection 88. Further, a spacer member 92 is interposed between the projection 88 and the extension 90 for dimensional adjustment in the stacking direction.

The extension 90 includes a latch 94 formed by a step protruding toward the side surface 51a of the end plate 18a or the side surface 51b of the end plate 18b to abut against the projection 88.

The fixing mechanism 86 includes screw holes 96 formed in the side surface 51a of the end plate 18a or the side surface 51b of the end plate 18b, holes 98 formed in the extension 90 of the coupling member 82, and screws 100 inserted through the holes 98 and screw-engaged into the screw holes 96. The extension 90 has a recess 102 as a space for providing the screws 100.

In the second embodiment, the extension 90 provided at each of both ends in the longitudinal direction of the coupling member 82 is attached across the projection 88 provided in the end plate 18a or the end plate 18b. Therefore, the projection 88 and the extension 90 abut against each other, and tension in the tightening direction is applied to the fuel cell stack 80.

In the structure, the tightening force for tightening the coupling members 82 and the end plates 18a, 18b is maintained by the fixing mechanisms 86. Thus, in the second embodiment, the same advantages as in the first embodiment are obtained. Further, the distance between the end plates 18a, 18b can be adjusted by the coupling members 82 and the holding mechanisms 84.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A fuel cell stack comprising:
    a plurality of fuel cells stacked together in a stacking direction, the fuel cells each including a membrane electrode assembly and a separator stacked together, the membrane electrode assembly including a pair of electrodes and an electrolyte membrane interposed between the electrodes;
    a pair of end plates provided at opposite ends of the fuel cells in the stacking direction,
    a coupling member bridging between the end plates;
    a holding mechanism provided in a side surface of the end plate and the coupling member, for applying tension in a tightening direction; and
    a fixing mechanism coupled to the side surface of the end plate and the coupling member for fixing the side surface of the end plate and the coupling member together, wherein the holding mechanism and the fixing mechanism are provided on the same side surface of the end plate, and the side surface of the end plate extends along the stacking direction.

2. A fuel cell stack according to claim 1, wherein the holding mechanism has a hole formed in at least the side surface of the end plate or the coupling member, and a pin member inserted into the hole.

3. A fuel cell stack according to claim 2, wherein a reinforcement ring is press-fitted into the hole; and
    the pin member is inserted into the reinforcement ring.

4. A fuel cell stack according to claim 2, wherein a seal member for sealing the pin member is provided in the hole.

5. A fuel cell stack according to claim 1, wherein the holding mechanism includes a projection provided on the side surface of the end plate; and
    an extension provided in the coupling member, the extension protruding outwardly in the lateral direction of the coupling member and extending outwardly in the stacking direction across the projection to engage the projection.

6. A fuel cell stack according to claim 5, wherein a spacer member for dimensional adjustment in the stacking direction is provided between the projection and the extension.

7. A fuel cell stack according to claim 1, wherein fluid passages extend through the fuel cells in the stacking direction, a reactant gas and a coolant flowing through the fluid passages; and
    a portion connecting the coupling member and the side surface of the end plate is provided at a position that is offset from the fluid passages.

* * * * *